United States Patent [19]
Bard et al.

[11] Patent Number: 5,543,610
[45] Date of Patent: *Aug. 6, 1996

[54] COMPACT BAR CODE SCANNING ARRANGEMENT

[75] Inventors: Simon Bard, Stony Brook; Askold Strat, Patchogue; Joseph Katz; Boris Metlitsky, both of Stony Brook, all of N.Y.

[73] Assignee: Symbol Technologies, Inc., Bohemia, N.Y.

[*] Notice: The term of this patent shall not extend beyond the expiration date of Pat. No. 5,410,140.

[21] Appl. No.: 228,172

[22] Filed: Apr. 15, 1994

Related U.S. Application Data

[63] Continuation of Ser. No. 884,734, May 15, 1992, abandoned, which is a continuation-in-part of Ser. No. 868,401, Apr. 14, 1992, Pat. No. 5,280,165, which is a division of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.$^6$ ........................................... G06K 7/10
[52] U.S. Cl. ........................... 235/462; 235/472; 235/467
[58] Field of Search .................................. 235/472, 462, 235/467

[56] References Cited

U.S. PATENT DOCUMENTS

| 3,978,318 | 8/1976 | Romeo | 235/472 |
|---|---|---|---|
| 4,264,199 | 4/1981 | Minoura | 354/202 |
| 4,685,775 | 8/1987 | Goodman | 354/202 |
| 4,714,830 | 12/1987 | Usui | 354/202 |
| 4,732,440 | 3/1988 | Gadhok | 350/6.6 |
| 4,766,299 | 8/1988 | Tiernay | 235/472 |
| 4,902,083 | 2/1990 | Wells | 350/6.6 |
| 4,919,500 | 4/1990 | Paulsen | 350/6.6 |
| 5,168,149 | 12/1992 | Dvorkis | 235/472 |
| 5,170,277 | 12/1992 | Bard | 235/472 |
| 5,185,676 | 2/1993 | Nishibari | 354/202 |
| 5,191,197 | 3/1993 | Metlitsky | 235/472 |
| 5,305,181 | 4/1994 | Schultz . | |
| 5,340,972 | 8/1994 | Sandor | 235/472 |

FOREIGN PATENT DOCUMENTS 0471291  2/1992  European Pat. Off. .

Primary Examiner—Harold Pitts
Attorney, Agent, or Firm—Lowe, Price, LeBlanc & Becker

[57] ABSTRACT

A bar code scanning system including an optical scanner for scanning a target symbol, such as a bar code, and generating a corresponding electrical signal. The scanner housing may be mounted to a single finger ring support, which can be cylindrical in shape. The scanner housing may include a scanner activation switch, which may be of the voice recognition type. A transmitter for transmitting the analog or digitized electrical signal, either by wire or RF signal, to a receiver on the user's person is also included in the scanner housing. A decoder is preferably included within the receiver housing. The receiver housing may also have a display for displaying decoded data and a keyboard for inputting entry data. Signal processing circuitry for digitizing the electrical signals generated by the scanner may be included either in the scanner or receiver housing. The receiver housing also may include an RF transmitter for transmitting the decoded data and any entry data to a separate computer unit. The receiver housing can be worn on the user's wrist or belt.

86 Claims, 6 Drawing Sheets

COMPACT BAR CODE SCANNING ARRANGEMENT

CROSS-REFERENCE TO RELATED APPLICATIONS

This application is a continuation of application Ser. No. 07/884,734 filed May 15, 1992, now abandoned, which is a continuation-in-part of application Ser. No. 868,401, filed on Apr. 14, 1992, now U.S. Pat. No. 5,280,165, which is a division of application Ser. No. 520,464, filed May 8, 1990, which issued as U.S. Pat. No. 5,168,149, which is a continuation-in-part of application Ser. No. 428,770, filed on Oct. 30, 1989, which issued as U.S. Pat. No. 5,099,110. Each of the above identified applications is incorporated herein by reference.

This application is also related to application Ser. No. 789,705 filed on Nov. 8, 1991, now U.S. Pat. No. 5,412,198, which is also a continuation-in-part of Ser. No. 520,464, now U.S. Pat. No. 5,168,149; and application Ser. No. 812,923, filed on Dec. 24, 1991, now U.S. Pat. No. 5,262,627, which is also a continuation-in-part of Ser. No. 520,464, now U.S. Pat. No. 5,168,149.

BACKGROUND OF THE INVENTION

1. Field of the Invention

The present invention relates generally to/a compact bar code scanning arrangement, and more particularly pertains to a compact bar code scanning arrangement which is simple, capable of producing several different types of scanning patterns, and does not utilize a relatively bulky motor-driven construction. In a preferred embodiment, the compact bar code scanner is used in a small housing mounted on an index finger of an operator such that the natural pointing direction of the index finger aims the scanner.

In general, it would be desirable to provide a compact bar code scanner which eliminates the need for bulky motor-driven constructions and is capable of achieving a high speed 250–300 Hz scan motion.

The present invention provides a compact bar code scanner which is capable of scanning in any one of several modes, a linear scan mode which scans along a single axis, an omnidirectional scan mode which scans with consecutive scan lines which are angularly displaced relative to each other, such as a Lissajous scan pattern, or a raster scan mode which scans with consecutive scan lines along a first scan axis, and the consecutive scan lines are displaced relative to each other along a second perpendicular axis. With a Lissajous scan pattern, scans are performed according to the combination of two x and y sinusoidal drive signals. In the special case wherein the frequency of the x drive signal $f_x=f_y$, the frequency of the y drive signal, the Lissajous scan is a circular scan pattern, and when $f_x \neq f_y$, many different complex scan patterns can be generated depending upon the relationship of $f_x$ to $f_y$.

2. Discussion of the Prior Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, with the bars and spaces having different light-reflecting characteristics.

The scanning of bar code patterns has become more complex as bar code patterns have become both more complex and more compact. A typical bar code pattern includes lines and spaces of different widths extending in an x direction, and can be scanned by one or more linear scans in the x direction. Moreover, because the direction of the scan is not always precisely aligned with the direction of the bar code pattern, more complex omnidirectional scanning patterns are sometimes used, wherein consecutive scan lines are angularly displaced relative to one another to form a complex omnidirectional scanning pattern. Two dimensional (2D) bar code patterns (Code 49) have also been introduced wherein, in addition to a typical bar code pattern having lines and spaces of varying widths along an x direction, typical bar code patterns are stacked one upon the other in the y direction to form the 2D bar code pattern. Accordingly, scanning of a 2D bar code pattern is more complex, and requires a raster type of scan wherein consecutive x direction scans are displaced in the y direction by the spacing between stacked rows of the 2D bar code pattern to form a raster scan.

The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been commonly assigned to the same assignee as the present application.

As disclosed in some of the above patents, one embodiment of such a scanning system resides, inter alia, in a portable laser scanner which is grasped and hand-held by a user, which is designed to allow the user to aim the scanner, and more particularly a light beam emanating therefrom, at a target bar code symbol to be read.

In prior art bar code scanners, the light source in a laser scanner is typically a gas laser or semiconductor laser. The use of a semiconductor device such as a laser diode as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spacers. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For the purpose of this discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two-dimensional bar codes; that is, the reader must be aimed at each row individually. Likewise, the multiple-scan-line readers produce a number of scan lines at an angle to one another so these are not suitable for recognizing a Code 49 type of two-dimensional symbols.

In the scanning systems known in the prior art, the light beam is directed by a lens or similar optical components along a light path toward a target that includes a bar code symbol on the surface. The scanning functions by repetitively scanning the light beam in a line or series of lines across the symbol. The scanning component may either sweep the beam spot across the symbol and trace a scan line across and past the symbol, or scan the field of view of the scanner, or both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected by the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters represented thereby.

The decoding process in known scanning systems usually works in the following manner. The decoder receives the pulse width modulated digital signal from the scanner, and an algorithm implemented in software attempts to decode the scan. If the start and stop characters and the characters between them in the scan are decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader incorporates detectors based upon charge coupled device (CCD) technology. In such readers, the size of the detector is larger than or substantially the same as the symbol to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

SUMMARY OF THE INVENTION

Accordingly, it is a primary object of the present invention to provide a compact bar code scanning arrangement. In a preferred embodiment, the compact bar code scanner is used in a small housing mounted on an index finger of an operator such that the natural pointing direction of the index finger aims the scanner.

A further object of the subject invention is the provision of a compact bar code scanning arrangement which is simple, capable of producing several different types of scanning patterns, is capable of achieving high scanning rates, and does not utilize a relatively bulky motor-driven construction.

The present invention provides a compact bar code scanner which in different embodiments is capable of scanning in any one of several modes, a linear scan mode in which it scans along a single axis, an omnidirectional scan mode in which it scans with consecutive scan lines which are angularly displaced relative to each other in an omnidirectional scan pattern, such as a Lissajous scan pattern, or a raster scan mode in which it scans with consecutive scan lines along a first scan axis, and the consecutive scan lines are displaced relative to each other along a second perpendicular axis.

In accordance with several embodiments disclosed herein, the present invention provides a compact bar code scanner in which a flexural member is supported at one end in a cantilever fashion by a base, and mounts thereon a permanent magnet and a scanning mirror which has a scanning beam directed thereon, as from a visible laser diode. A drive coil is positioned adjacent to the permanent magnet, and during operation a periodically changing drive signal introduced into the coil induces a periodically changing magnetic field. The periodically changing magnetic field causes the flexural member, with the permanent magnet and scanning mirror mounted thereon, to oscillate at the frequency of the periodically changing drive signal, thereby causing a linear scanning of the scanning beam. For efficiency of operation, the resonant mechanical frequency of the flexural member with the scanning mirror and permanent magnet mounted thereon is designed to be at or near the frequency of the periodically changing drive signal.

In general, the embodiments disclosed herein are designed to operate at or near their resonant frequencies. However, the embodiments do not have to operate precisely at or near their resonant frequencies, and this is particularly true of the torsional mode embodiments.

In accordance with several embodiments disclosed herein, the permanent magnet is encircled by the drive coil, and the permanent magnet is mounted on the flexural member with an axis extending substantially centrally through its North and South poles also extending substantially perpendicular to the surface of said flexural member.

The present invention also provides a bar code scanning system in which a first housing is adapted to be worn on a user's finger. The first housing includes a symbol detection means for generating a light beam directed toward a symbol to be read on a target and for receiving reflected light from the symbol to produce an electrical signal corresponding to the intensity of the reflected light, and also a switch for energizing the scanning beam. The housing is mounted on the finger in a position to project a scanning beam forwardly generally in the natural pointing direction of the finger. The electrical signal is transferred from the first housing to a second housing which includes a signal processor for processing the electrical signal to generate therefrom a digitized signal descriptive of the bar code symbol. The second housing is mounted on the user's wrist, and includes therein a decoder for translating the digitized signal into data represented by the bar code symbol.

In an alternative embodiment, the present invention provides a bar code scanning system in which a first housing is adapted to be mounted on a user's finger to project a scanning beam forwardly generally in the natural pointing direction of the finger. The first housing includes a symbol detection means for generating a light beam directed toward a symbol to be read on a target and for receiving reflected light from the symbol to produce an electrical signal corresponding to the intensity of the reflected light, and a switch for energizing the light beam. The first housing also includes therein a signal processor for processing the electrical signal to generate therefrom a digitized signal descriptive of the bar code symbol, which is transferred from the first housing. In greater detail, the digitized signal is transferred from the first housing to a second housing mounted on the user's wrist which includes therein a decoder for translating the digitized signal into data represented by the symbol.

BRIEF DESCRIPTION OF THE DRAWINGS

The foregoing objects and advantages of the present invention for a compact bar code scanning arrangement may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
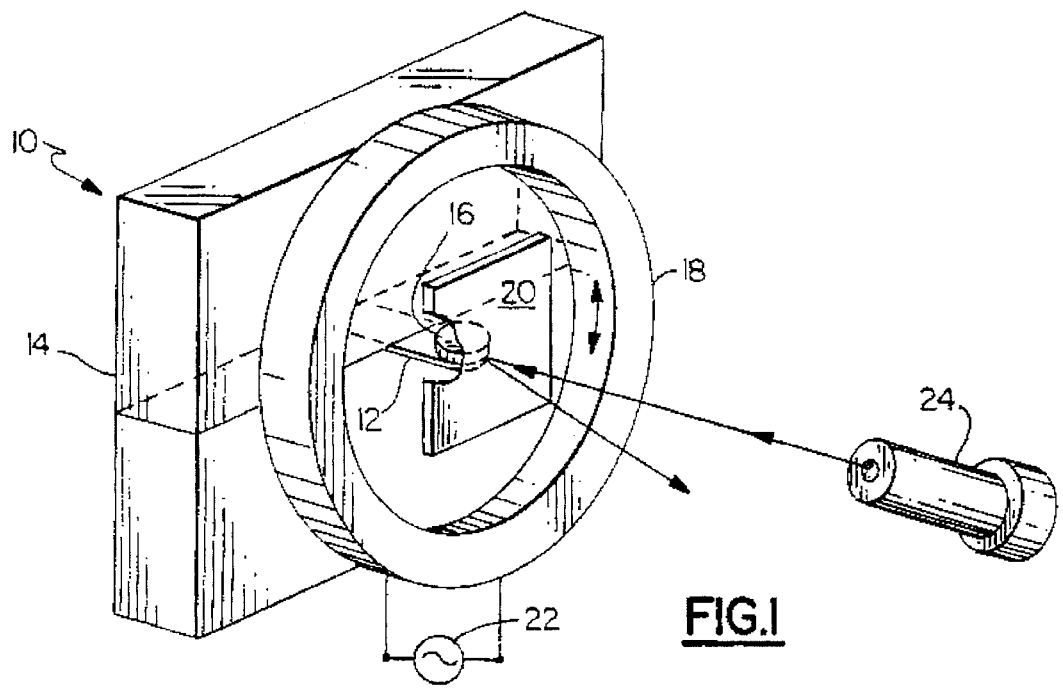
FIG. 1 is a perspective view of an exemplary embodiment of a simple and compact linear scanning arrangement pursuant to the teachings of the present invention which is driven without a traditional bulky motor.

FIG. 1 illustrates a first embodiment of the present invention for a simple and compact, high speed, linear bar code scanner which is driven without a traditional bulky motor. Referring to FIG. 1, a linear scanning arrangement 10 is provided in which a flexural strip 12 of a suitable flexible material such as Mylar is cantilever mounted to a base 14, as by being secured between two halves of the base 14. The flexural strip 12 supports thereon a miniature permanent magnet 16 positioned inside a coil 18, with an axis passing centrally through the North and South poles of the permanent intersecting the surface of the flexural strip 12 substantially perpendicular thereto. The coil 18 is also secured to the base 14, and a scan mirror 20 is attached to the free end of the cantilever mounted flexural strip 12. By changing the dimensions (length, width and thickness) or the flexural characteristics of the cantilever mounted strip 12, or the mass of the flexural strip 12, the permanent magnet 16 and mirror 20, or the distribution of mass on the flexural strip 12, different resonant frequencies can be established for the vibrating assembly. In general, the natural resonant frequency is determined by the size (length, width and thickness) and flexural strength of the cantilever mounted member, the distribution of mass, and the total mass of the vibrating assembly. Formulas are available and are known in the art to determine the resonant frequency of the vibrating assembly, which can also be tested and developed empirically. When a periodic drive signal 22, such as a sinusoidal signal, is introduced into the coil 18, the periodically reversing magnetic field induced thereby causes the cantilever mounted assembly to oscillate up and down, as shown in FIG. 1. This produces a linear scanning motion of the scan mirror 20, which causes a linear scanning of a beam directed onto the mirror by a suitable beam source such as a visible laser diode (VLD) 24. A sinusoidal periodic drive signal causes a periodically reversing magnetic field to be generated by the coil 18, thus creating moments of forces acting upon the North (N) and South (S) poles of the permanent magnet 18, to cause the magnet and the flexible strip 12 on which it is mounted, along with the scan mirror 20 (all of which comprise a cantilever mounted assembly) to vibrate up and down, perpendicular to the flat surface of the flexible strip 12, at a frequency dependent upon the frequency of the periodic drive signal.

In general, and for all of the embodiments disclosed herein, it is desirable to drive a cantilever mounted assembly or a torsional mode mounted assembly with a periodic signal at or near the resonant frequency of the assembly, and to design the assembly with a natural resonant frequency as high as possible to achieve high scan rates of up to several hundred hertz (e.g. 500 Hz). However, lower scan rates are also possible. In general, the chosen scan rate depends upon the particular application, and a 36 scans per second scan rate is typical, which is generated by a periodic signal of 18 Hz.

It is noted that in the description herein, the descriptions of further embodiments often build upon the descriptions of earlier embodiments, and accordingly the descriptions of the details, construction and mode of operation, to the extent they are identical or similar, is generally not repeated for the additional embodiments.

Figure 2:
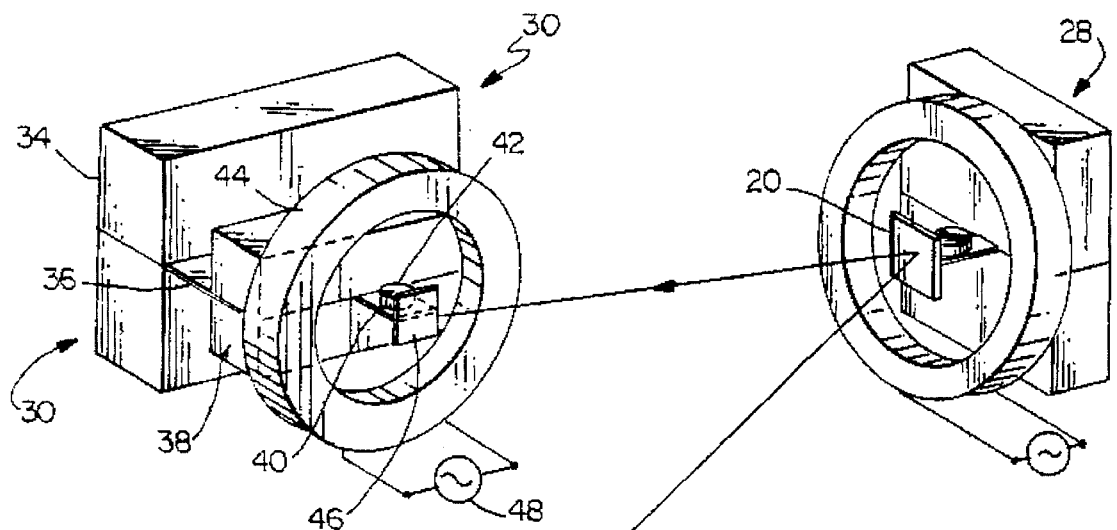
FIG. 2 illustrates a universal pattern scanning arrangement pursuant to the present invention which operates partially according to the principle of operation of the scanner of FIG. 1, and which is capable of scanning at a relatively high frequency in an x direction, and of either not being driven in y scanning to generate a linear x scanning pattern, or of scanning at two different frequencies in a y direction, a relatively high frequency for omnidirectional scanning patterns, or a relatively low frequency for raster scanning patterns.
Figure 2:
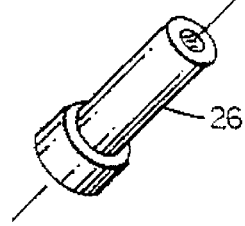

FIG. 2 illustrates a universal pattern, compact bar code scanning arrangement which operates partially according to the principle of operation of the scanner of FIG. 1, and which is capable of scanning at a relatively high frequency in an x direction, and of not scanning in a y direction for production of a linear x scan, or of scanning at two different resonant frequencies in a y direction, a relatively high frequency or a relatively low frequency. A variety of bar codes and different bar code reading conditions require different types of scan patterns, such as linear scans, raster scan patterns, or omnidirectional scan patterns such as Lissajous type scan patterns. The embodiment of FIG. 2 is capable of producing all of these scan patterns with a relatively simple construction, and includes a double resonant construction for producing either a high or low frequency y vertical scan motion.

In the universal scanning arrangement of FIG. 2, a light beam from a suitable source such as a Visible Laser Diode (VLD) 26 is directed initially onto a high speed horizontal x deflection arrangement 28 which produces high speed x scanning deflections of the beam. The x deflection arrangement 28 can be and preferably is the same as the linear scanning arrangement 10 in FIG. 1. The resultant x scanned beam is then directed to a vertical deflection arrangement 30, which produces either no, or low or high speed vertical scanning deflections of the beam, provided respectively for raster and omnidirectional scan patterns. The y scanning arrangement 30 includes a flexible base provided with two degrees of mechanical freedom to provide two resonant conditions, a low frequency y scan for raster patterns, and a high frequency y scan for omnidirectional patterns. The y scanning arrangement is driven by the electromagnetic forces produced by a coil 44 which encircles a permanent magnet 42 mounted in the y scanning assembly 30 in a manner similar to that as explained with reference to the embodiment of FIG. 1.

The y scanning assembly 30 comprises a base 34 which supports a cantilever mounted low frequency flexural strip 36 which supports at its free end a mass 38, which in turn supports a smaller cantilever mounted high frequency flexural strip 40. The flexural strip 40 mounts thereon the permanent magnet 42 positioned within the coil 44, and a scanning mirror 46 mounted at the free end of the flexural strip 40. In this arrangement, the mass 38 and all of the structure mounted thereon (40, 42, 46) can oscillate on the cantilever mounted low frequency flexible strip 36 at a low resonant frequency $f_{rL}$, and the magnet 42 and scan mirror 46 can oscillate on the smaller cantilever mounted high frequency flexible strip 40 at a high resonant frequency $f_{rh}$. The mass 38 is selected to tune the resonant frequency of the low frequency y flexural member to be at or near the low frequency y drive signal for efficient operation. Similar to the first embodiment, for efficient operation the resonant mechanical frequency of the high frequency y flexural member with the y scanning mirror and permanent magnet mounted thereon is designed to be at or near the frequency of the periodically changing high frequency y drive signal. The resonant frequency of each vibrating assembly is determined in general by the spring constant K of the vibrating member and the mass M and distribution of mass of the vibrating assembly. In the two degree of freedom embodiment of FIG. 2, each of the two vibrating assemblies has a different spring constant K ($K_1$ and $K_2$) and a different mass M ($M_1$ and $M_2$) and distribution of mass.

Selection of either the low resonant frequency $f_{rL}$ or the high resonant frequency $f_{rh}$ is accomplished by changing the frequency of the y periodic drive signal 48 through the y driving coil 44. When there is no driving current through the y driving coil 44, a laser beam from the VLD 26 is incident on the mirror 20 of the scanning assembly 28 which produces a fast (about 300 Hz) x scan line, which is directed onto and reflected by the mirror 46 of the y scanning assembly 30 without any changes in the scan pattern, thereby producing a linear horizontal scan line. When a low frequency signal 48 is connected to the y driving coil 44, it produces a low frequency vertical motion about the low frequency flexible strip 36, thereby producing a raster pattern. When a high frequency signal 48 is connected to the y driving coil 40, it produces a high frequency vertical motion about the high frequency strip 40, thereby producing an omnidirectional scanning pattern. In the second embodiment, the scanning movement in the y direction can be designed to be a desired ratio to the scanning movement in the x direction in accordance with the desired omnidirectional scan pattern.

Figure 3:
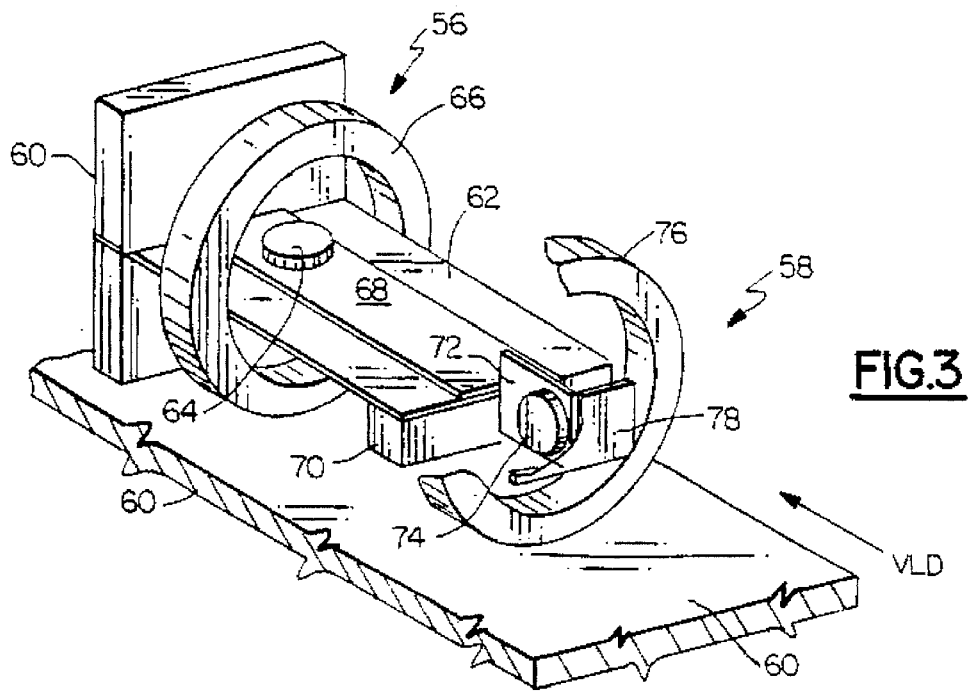
FIG. 3 illustrates a third embodiment of the present invention which is somewhat similar in operation to the embodiment of FIG. 2, but wherein y and x scanning mechanisms are mounted in a unitary assembly on a common base, and a single scan mirror performs both x and y scanning operations.

FIG. 3 illustrates a third embodiment of the present invention which is somewhat similar in operation to the embodiment of FIG. 2, but wherein y and x scanning mechanisms 56, 58 are mounted in a unitary assembly on a common base 60, which in a compact or miniaturized scanner can comprise a PC board. For perspective, in one designed embodiment the length of the base 60 was 1.1 inches, the height was 0.45 inches, and the width was 0.45 inches. The y scanning assembly 56 includes a flexural member 62, cantilever mounted to the base 60, which mounts a permanent magnet 64 positioned inside a y driving coil 66. The flexural member 62 can be fabricated of any suitable material such as Mylar, and includes thereon a damping flexural member 68 which can also be fabricated of any suitable material such as Mylar, which is included to damp higher frequency modes of oscillation of the y scanning assembly. A mass 70 is mounted at the free end of the cantilever flexural member 62 to tune the y scanning assembly to an appropriate low resonant frequency $f_{rL}$.

The x scanning assembly 58 includes a flexural member 72 cantilever mounted to the mass 70 at the free end of the y flexural member 72, and supports thereon a permanent magnet 74 positioned within an x driving coil 76. A single scan mirror 78 is mounted to the free end of the x flexural member 72, such that it is supported to be driven with high frequency x scanning movements and either no y scanning for a linear x scan or with a low frequency y scanning, to produce a raster type of scanning pattern. Each permanent magnet 64, 74 is encircled by each drive coil 66, 76, and each permanent magnet is mounted on each flexural member with an axis extending substantially centrally through its North and South poles also extending substantially perpendicular to the surface of the flexural member on which the permanent magnet is mounted. The feature of a single scan mirror is particularly advantageous as the small scan mirrors are expensive. The embodiment of FIG. 3 can produce a linear scan pattern by actuation of only the x scanning assembly 58, or a raster scan pattern by actuation of both the y and x drive assemblies 56 and 58, but cannot generate an omnidirectional scanning pattern.

Figure 4:
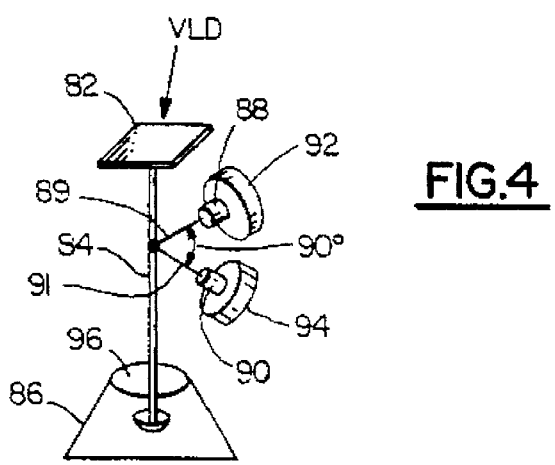
FIGS. 4, 5 and 6 illustrate three related embodiments of the present invention which are capable of producing virtually any different type of scanning pattern, including linear, omnidirectional such as Lissajous, or raster scanning patterns, and which utilize a single scanning mirror mounted at the free end of an electromagnetically driven central rod, which is capable of oscillating in two orthogonal x and y directions.
Figure 5:
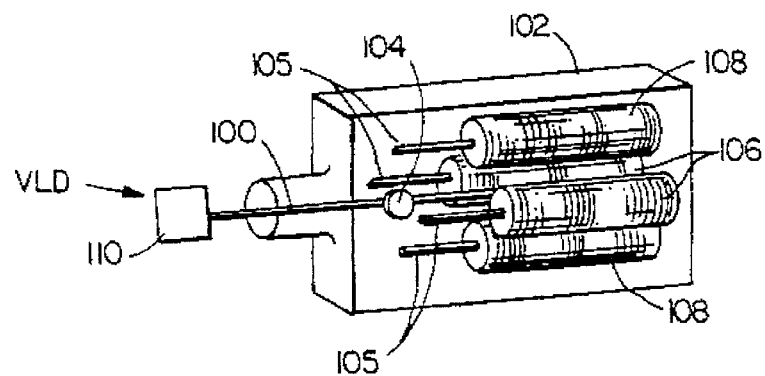
Figure 6:
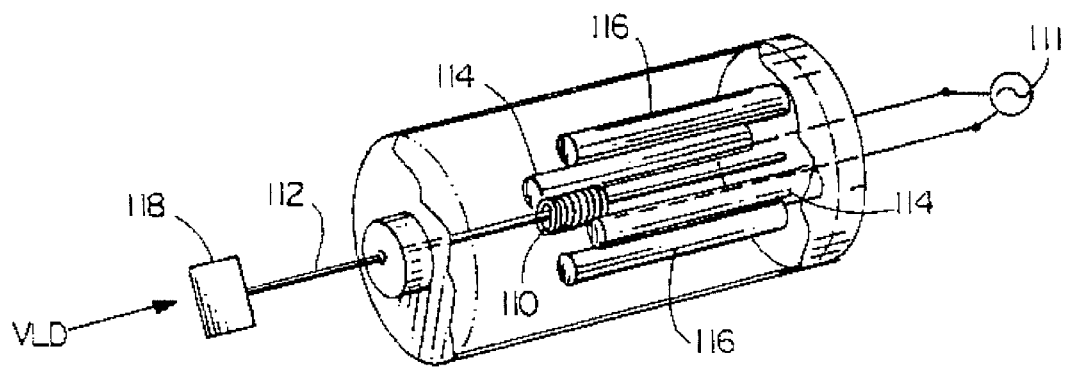

FIGS. 4, 5 and 6 illustrate three related embodiments of the present invention for a compact bar code scanner which include a flexural member supported at one end in a cantilever fashion by a base, with the flexural member being able to flex in both orthogonally oriented x and y directions. A single scanning mirror is mounted on the flexural member for movement therewith, and a scanning beam is directed thereon. These embodiments are capable of producing virtually any scanning pattern, including linear, omnidirectional such as Lissajous, or raster scan patterns, and which utilize a single scanning mirror.

In the embodiment of FIG. 4, a scan mirror 82 is mounted at the free end of a flexible shaft 84, the other end of which is flexibly fixed to a base 86 to provide a cantilever type mounting for the flexible shaft, which is capable of vibrating in both x and y directions. Two permanent magnets 88, 90 are mounted as by short mounting supports 89, 91 to the flexible shaft 84 and are mounted perpendicularly at 90° relative to each other. In this arrangement, axes extending centrally through both N and S poles of the permanent magnets 88 and 90 coincide respectively with the central axes of x and y driving coils 92, 94. In this arrangement, each of the coils 92, 94, when driven with a periodic drive signal, generates an alternately reversing magnetic field, as described hereinafter with reference to FIG. 10, with the alternately reversing magnetic field alternately attracting and repelling the pole of the permanent magnet positioned closest to the coil. A damping material 96 such as rubber, silicon, etc. is used to mount and hold the shaft 84 in place to the base 86 to create a restoring force and to damp oscillations thereof.

The embodiments of FIGS. 5 and 6 are similar, and their designs are based upon the designs of driving cartridges currently utilized to cut master records (e.g. 33 or 45 rpm recorded records). These driving cartridges are produced by manufacturers such as Shure Brothers, Inc. In the embodiment of FIG. 5, a central shaft 100 is supported in a small cartridge 102, and supports a small magnet 104 which is positioned centrally between projecting magnetic cores 105 of two pairs of x and y driving coils 106, 108, with the pair of x driving coils being oriented orthogonally with respect to the pair of y driving coils. A single scan mirror 110 is supported at the free end of the shaft 100, and is driven in x and y scanning movements by periodic drive signals applied to the x and y driving coils 106, 108.

The embodiment of FIG. 6 is functionally symmetrically opposite to the embodiment of FIG. 5, and includes a single moving coil 110, having an input 111, which is mounted on a shaft 112 which interacts magnetically with stationary pairs of opposed x and y permanent magnets 114, 116. A single scanning mirror 118 is mounted at the free end of the shaft 112, and is driven in x and y scanning movements by a periodic drive signal applied to the coil 110.

Figure 7:
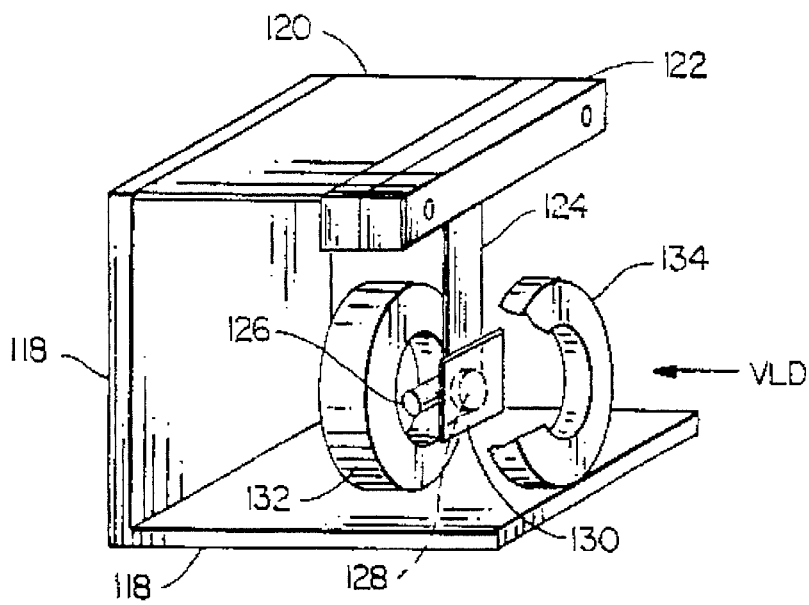
FIGS. 7 and 8 illustrate two related universal scanning embodiments of the present invention which include a base which mounts in cantilever fashion a low frequency y flexural member which mounts at its free end in cantilever fashion a high frequency flexural member, and wherein an x drive coil is driven with a constant high frequency drive signal to produce x scan deflections, and a second y drive coil uses a drive signal which is one of two fixed frequencies, a low frequency drive signal for raster scanning patterns, or a high frequency drive signal for omnidirectional scanning patterns.
Figure 8:
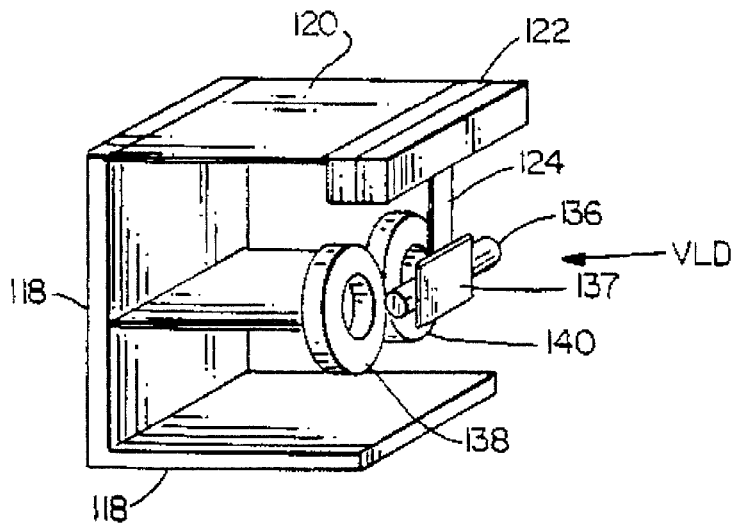

FIGS. 7 and 8 illustrate two related universal scanning embodiments of the present invention. The embodiment of FIG. 7 includes a base 118 which mounts in cantilever fashion a relatively wide, low frequency y flexural member 120 which mounts at its free end a mass 122. The mass 122 in turn mounts in cantilever fashion a relatively narrow, high frequency flexural member 124, which supports thereon two mutually perpendicular permanent magnets 126, 128 (can also be one T or cross shaped magnet) and a scan mirror 130 which is secured to the inner end (rightmost in FIG. 7) of the magnet 128. The permanent magnet 126 is positioned adjacent to an x drive coil 132, and the permanent magnet 128 is positioned adjacent to a y drive coil 134, with the assembly being positioned in the air gap between the two parallel coils 132, 134, which are driven by two periodic drive signals. The x drive coil 132 is driven with a constant high frequency drive signal to produce x scan direction deflections, and the second y drive coil 134 uses a drive signal which is one of two fixed frequencies, a low frequency drive signal for a raster scan pattern, or a high frequency drive signal for Lissajous scanning patterns.

Figure 10:
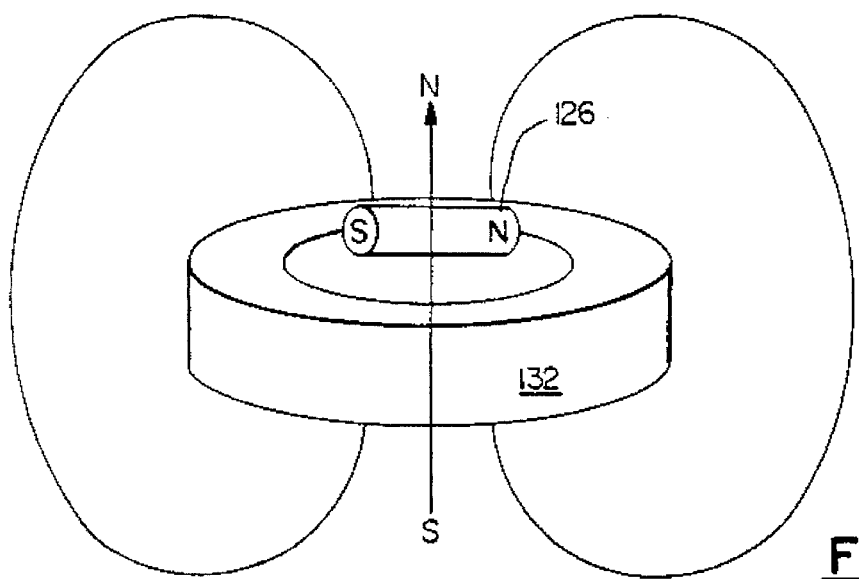
FIG. 10 illustrates the mode of operation of the x driving mechanism in the embodiments of FIGS. 7, 8 and 9, in which a permanent magnet interacts with an adjacent x driving coil.

FIG. 10 illustrates the mode of operation of the x driving mechanism in the embodiment of FIG. 7 in which permanent magnet 126 interacts with the x driving coil 132. When the coil 132 has a periodic drive signal applied thereto, the N and S poles thereof periodically reverse themselves. When the N pole is at the top and the S pole is at the bottom of FIG. 10, as illustrated in FIG. 10, the permanent magnet 126 and the flexural member 124 to which it is secured are torsionally twisted such that the S end of the permanent magnet is twisted towards the N pole at top, and the N end of the permanent magnet is twisted towards the S pole at the bottom. When the poles of the driving coil are reversed and the S pole is at the top and the N pole is at the bottom of FIG. 10, the permanent magnet 126 and the flexural member 124 are twisted in an opposite direction such that the N end of the permanent magnet 126 is twisted towards the S pole at the top, and the S end of the permanent magnet 126 is twisted towards the N pole at the bottom. Accordingly, the permanent magnet 126 and the flexural member 124 to which it is attached, and the scanning mirror 130, are alternately twisted and oscillated in clockwise and counterclockwise x scanning movements.

The y scanning mechanism in the embodiment of FIG. 7 operates in a manner similar to the embodiment of FIG. 4. The permanent magnet 128 is positioned with an axis extending centrally through the N and S ends of the permanent magnet being positioned colinear with the central axis of the y drive coil 134. One end of the permanent magnet 128 is positioned closest to the drive coil, such that as a periodic drive signal reverses the poles of the coil 134, the end of the magnet 128 closest to coil 134 is periodically attracted to and repelled by the reversing poles of the coil 134, thereby causing either the low frequency flexural strip 120 or the high frequency flexural strip 124 to bend periodically to produce either a high frequency scan with a high frequency drive signal or a low frequency scan with a low frequency drive signal.

For efficiency of operation, the torsional resonant mechanical frequency of the high frequency flexural member 124 with the scanning mirror 130 and permanent magnets 126, 128 mounted thereon is designed to be at or near the frequency of the periodically changing x drive signal. Moreover, the bending resonant mechanical frequency of the high frequency flexural member 124 with the scanning mirror 130 and permanent magnets 126, 128 mounted thereon is designed to be at or near the frequency of the periodically changing high frequency y drive signal. Also, the mass 122 is selected to tune the resonant frequency to the low frequency y drive signal.

In the seventh embodiment, the permanent magnets 126, 128 are positioned in an air gap between the x and y drive coils 132, 134, which are mounted with their central axes substantially colinear.

The embodiment of FIG. 8 includes a base 118, a low frequency y drive flexural member 120, mass 122, and a high frequency x drive flexural member 124, similar to the embodiment of FIG. 7. The drive arrangement includes a single horizontally positioned permanent magnet 136, with a scan mirror 137 mounted thereon, which is positioned adjacent to and is controlled and driven in scanning movements by two adjacent x and y drive coils 140, 138 which are wound on a soft metal core. The x drive coil 140 is positioned opposite the center of the permanent magnet and controls the horizontal x scanning motion, with the operation thereof being similar to the operation of the embodiment of FIG. 7 (x scan). The y drive coil 138 is positioned parallel to and side by side with the first coil opposite to one poled end of the permanent magnet and controls the y vertical scanning motion. As the polarity of the y drive coil is periodically reversed, the poled end of the permanent magnet in front of coil 138 is periodically attracted to and repelled by the alternating polarity of the x drive coil 138 which produces either low frequency y scanning by low frequency flexing of the low frequency flexural member 120, or high frequency y scanning by high frequency flexing of the high frequency flexural member 124.

Figure 9:
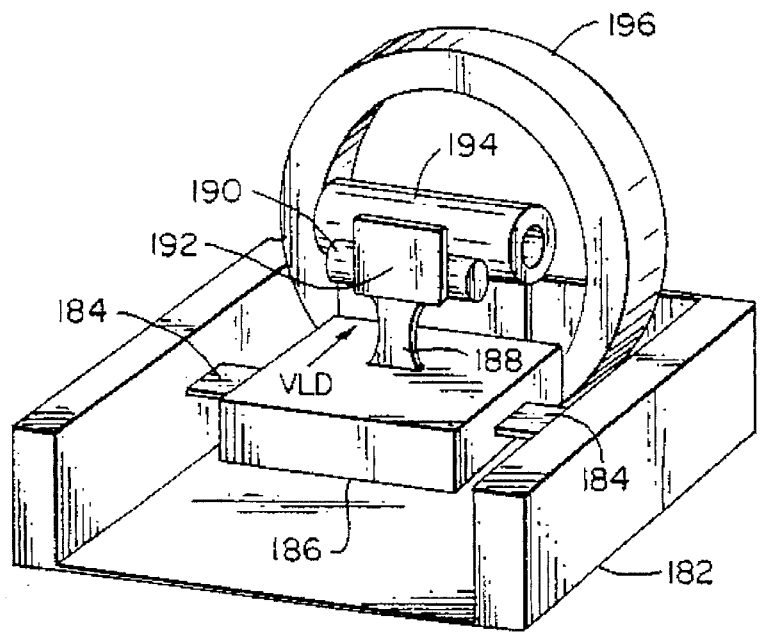
FIG. 9 illustrates a preferred embodiment of a universal compact bar code scanning arrangement pursuant to the present invention in which a base includes a low frequency y flexural mounting for a mass which provides a low frequency y scanning motion, and a second flexural member is cantilever mounted on the mass and mounts at its surface a scanning mirror and a permanent magnet which interacts with an adjacent encircling x driving coil to produce high frequency x scanning movements and with an adjacent y driving coil to produce either no, or high or low frequency y scanning movements.

FIG. 9 illustrates a preferred embodiment (best mode) of a compact bar code scanning arrangement pursuant to the present invention in which a mass 186 is mounted to a flexural mount 184, with each end thereof extending from an opposite side of the mass 186, which is periodically torsionally flexed back and forth to provide a slow vertical y scanning motion. In a preferred embodiment, a single flexural member 184 extends between two base mounts 182, with the mass 186 being secured to the single flexural member, as on the top thereof. Moreover, the single flexural member could be a suitable torsional rod attached directly to the base mounts 182, or attached indirectly to the base mounts 182 by suitable torsional springs. A second flexural member 188 is cantilever mounted on the mass 186, and mounts at its surface a permanent magnet 190 and a scanning mirror 192. The permanent magnet 190 interacts with an adjacent y driving coil 194 and an adjacent encircling x driving coil 196, with the magnet 190 interacting with the coils 194 and 196 in a manner as illustrated respectively in FIGS. 11 and 10.

Figure 11:
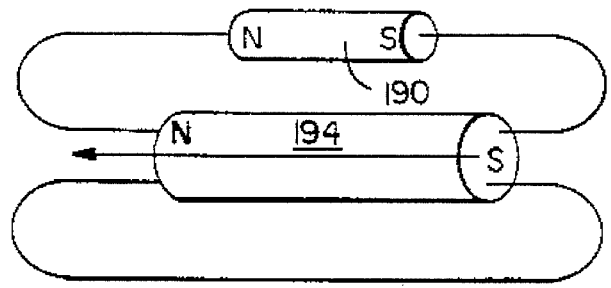
FIG. 11 illustrates the orientation of the permanent magnet of the embodiment of FIG. 9 relative to the y driving coil, and illustrates the manner in which the permanent magnet interacts with the y driving coil.

FIG. 11 illustrates the orientation of the permanent magnet 190 relative to the y driving coil 194, and illustrates the manner in which permanent magnet 190 interacts with the y driving coil 194. As a periodic drive signal is applied to drive coil 194, the poles of driving coil 194 periodically change from N to S. When the y drive coil 194 has its N pole at the left end and its S pole at the right end, as illustrated in FIG. 11, the magnet 190 is repelled thereby and is displaced away from the coil 194, and when the poles of the coil 194 are reversed, with the S pole at the left end and the N pole at the right end, the magnet 190 is attracted thereby and is displaced towards the coil 194, thus resulting in the magnet 190 being periodically oscillated away and towards the coil y drive 194 to produce a y scanning movement. When a low frequency y drive signal is utilized, the low frequency y drive flexural members 184 support a low frequency y drive oscillation of mirror 192, and when a high frequency y drive signal is utilized, the high frequency flexural member 188 supports a high frequency y drive oscillation.

The high frequency x drive coil 196 produces alternating reversals of the poles of the coil 196, and operates in a manner similar to the embodiment of FIG. 7 (x drive). When an N pole is present at the end of coil 196 adjacent to the permanent magnet 190, the S end of the permanent magnet is attracted thereto and the N end of the permanent magnet is repelled thereby, thus producing a periodic clockwise and counterclockwise torsional flexing of the flexural member 188, to produce a high frequency x scanning of the flexural member 188 and the mirror 192 mounted thereon.

In summary, two coils 194, 196, with mutually perpendicular axes, are located adjacent the magnet/mirror assembly, with coil 194 positioned in coil 196, and provide magnetic force which causes the entire assembly to oscillate in three modes, including a high frequency horizontal oscillation mode, either alone, or in a high frequency vertical oscillation mode or in a low frequency vertical oscillation mode.

In the ninth embodiment, the mass 186 tunes the torsional resonant frequency of the low frequency flexural member 184 which extends from opposite sides of the mass to the base, and torsionally flexes during low frequency y scanning operations.

Figure 12:
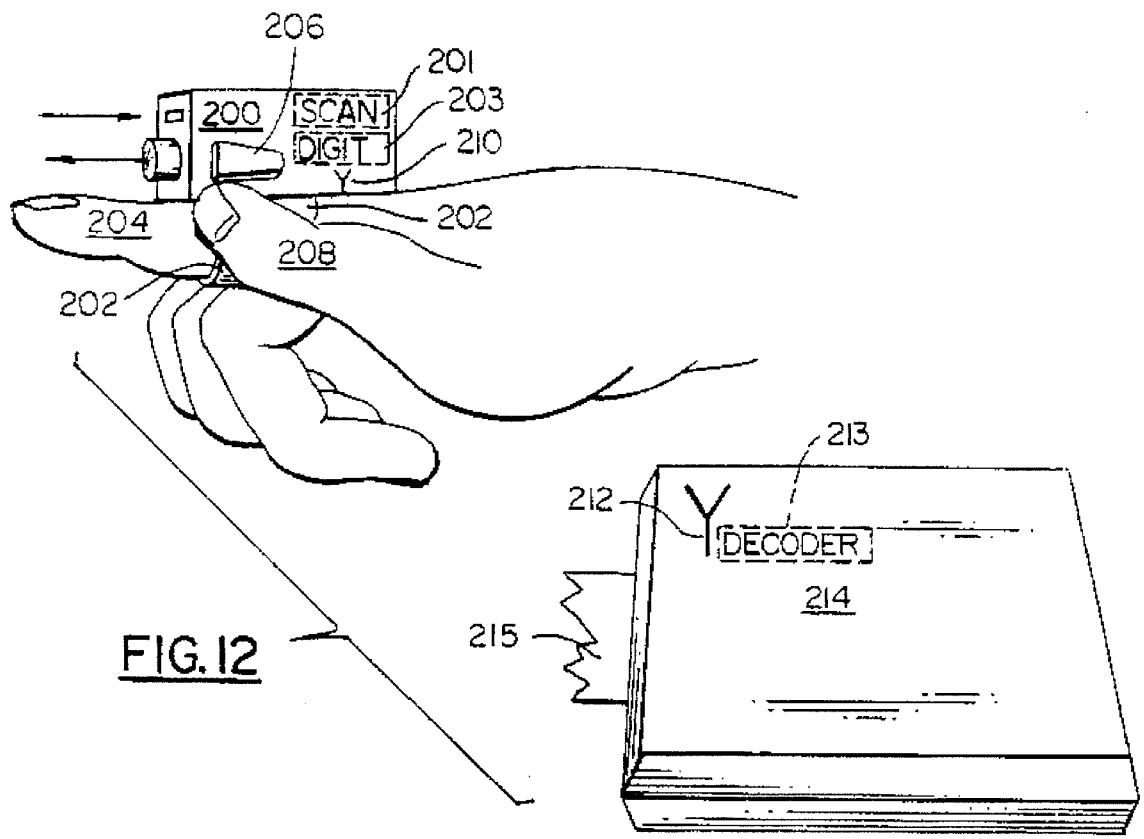
FIG. 12 illustrates an arrangement wherein a miniature scanner as disclosed herein for a bar code reader is mounted within a housing supported on an index ring mounting on the index finger of an operator, and the electronics in the bar code reader communicates by a short range radio transmitter with a receiver which might typically be mounted on the belt of the operator.

FIG. 12 illustrates an arrangement wherein a miniature scanner 201 as disclosed herein for a bar code reader is mounted within a housing 200 supported on an index ring mounting 202 on the index finger 204 of an operator. A trigger switch 206 is provided on the side of the housing 200 which is activated by the operator's thumb 208 to actuate the scanner 201. The electronics in the bar code reader communicates the data it has acquired by a short range radio transmitter 210 in the housing 200 to broadcast to an antenna 212 of a receiver in an associated control unit 214, which might typically be mounted on the belt 215 of the operator. The control unit 214 in the second housing typically would include a display, a keyboard, or a touch screen functioning as a display/keyboard, similar to that illustrated in FIG. 13. In an alternative embodiment, the scanner could be voice activated with a voice recognition means installed in either the housing 200 or the control unit 214.

A typical prior art bar code reader includes a bar code scanner, a signal digitizer, and a decoder. The bar code scanner generates a light beam directed toward a symbol to be read on a target and receives reflected light from the symbol to produce an analog electrical signal corresponding to the intensity of the reflected light. The signal digitizer includes a signal processor for processing the analog electrical signal to generate therefrom a digitized signal descriptive of the bar code symbol. The decoder decodes or translates the digitized signal into data represented by the symbol.

In the embodiment of FIG. 12, the finger mounted housing 200 includes therein the bar code scanner 203 for producing an analog electrical signal and a signal digitizer 203 for generating therefrom a digitized signal descriptive of the bar code symbol. The digitized signal is then transmitted by radio transmission to a decoder 213 located in the control unit 214.

Figure 13:
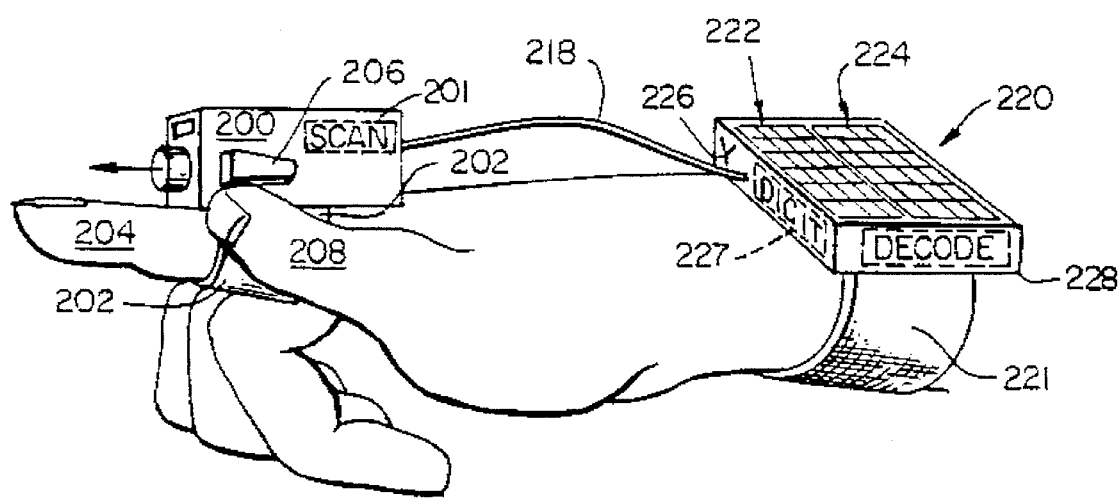
FIG. 13 illustrates an arrangement similar to FIG. 12 wherein a miniature scanner as disclosed herein for a bar code reader is mounted within a housing supported on an index ring mounting on the index finger of an operator, and the electronics in the bar code reader communicates by a wire with a portable terminal mounted on a wrist band on the wrist of the operator.

FIG. 13 illustrates an arrangement similar to FIG. 12 wherein a miniature scanner 201 as disclosed herein for a bar code reader is mounted within a housing 200 supported on an index ring mounting 202 on the index finger 204 of an operator. A trigger switch 206 is provided on the side of the housing 200 which is activated by the operator's thumb 208, or alternatively a voice activated arrangement could be utilized therein. The electronics in the bar code reader communicates the analog signal produced by the scanner 201 by a wire 218 with a portable control terminal 220 mounted on a wrist band 221 in a wristwatch like manner on the wrist of the operator. The portable terminal 220 typically includes an LED display 222, an array 224 of entry keys, and an antenna 226 for communicating with a central computer. The analog signal on wire 218 is directed to a signal digitizer 227 located in the control terminal 220 which digitizes the analog signal, and the output digitized signal therefrom is directed to a decoder 228 also located in the control terminal 220. The output of the decoder, which is data represented by the scanned bar code symbol, is then transmitted by 226 to the central computer. Accordingly, the embodiment of FIG. 13 also differs from the embodiment of FIG. 12 by placing the digitizer 227 in the associated control terminal 220 rather than in the housing 200.

Figure 14:
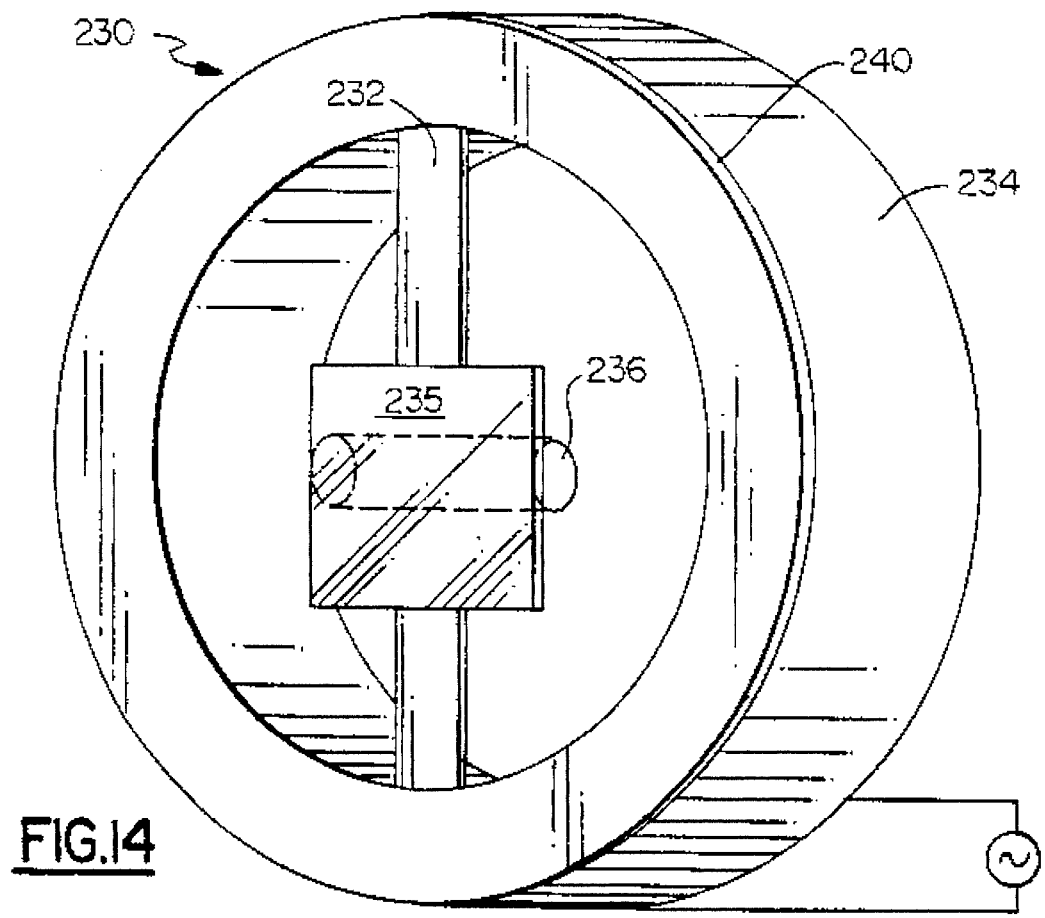
FIGS. 14 and 15 illustrate respectively a front perspective view and a side elevational view of a further embodiment of a torsional mode, miniature scanning element pursuant to the present invention.
Figure 15:
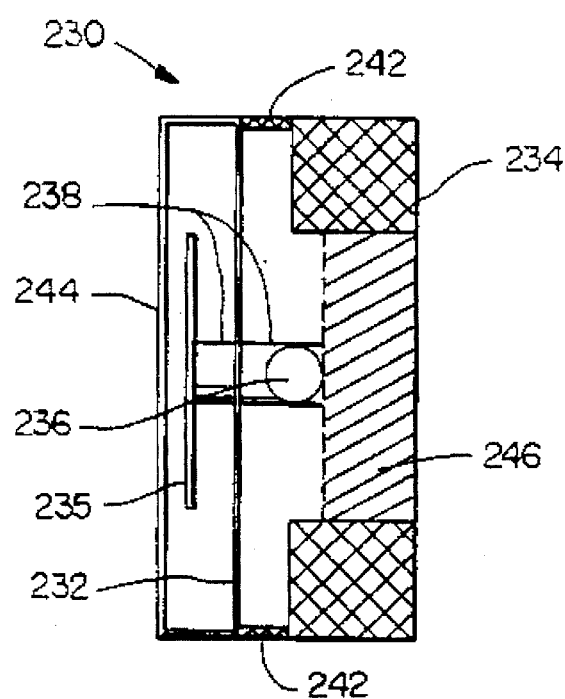

FIGS. 14 and 15 illustrate respectively a front perspective view and a side elevational view of a further embodiment 230 of a torsional mode, miniature scanning element pursuant to the present invention. The embodiment of FIGS. 14 and 15 advantageously can be operated from a very low frequency of about 1–2 Hz to a relatively high frequency of approximately 160–180 Hz without any physical changes or mechanical adjustments or tuning. The embodiment of FIGS. 14 and 15 is mechanically balanced, and the vertical mounting of a torsional flexural support member 232 therein advantageously does not result in any drooping of the torsional flexural support member and the components supported thereby. In this embodiment, a vertically mounted strip 232 of flexible material is attached and mounted at the top and bottom thereof to the front of a small magnetic coil 234. A permanent magnet 236 is mounted horizontally on one side of the flexible strip and a mirror 235 is mounted to the opposite side thereof. The permanent magnet and scanning mirror can be either attached directly to the flexible strip 232 or preferably by some type of holder 238. When an AC current is applied to the coil 234, interaction of the changing magnetic field of the coil 234 and the magnet 236 causes the flexible strip 232 to oscillate horizontally in a torsional mode.

The flexible strip 232 can be fixed to the coil by a holder 240 which might be mounted either directly to the front of the coil 234, as illustrated in FIG. 14, or with an intermediate shock absorber material 242, illustrated by a spring-like member in FIG. 15, in order to provide mechanical protection in the event of dropping of the scanning assembly 230. The holdes 240 might have a transparent shield 244 mounted on the front thereof to provide a sandwich-type of structure for protection of the mirror. In order to enhance performance and save energy, the coil preferably has a core 246 of soft steel or similar material.

While several embodiments and variations of the present invention for a compact bar code scanning arrangement are described in detail herein, it should be apparent that the disclosure and teachings of the present invention will suggest many alternative designs to those skilled in the art.

What is claimed is:

1. A bar code scanning system comprising:

a first housing having housed therein a light beam scanning means for generating a light beam and oscillating the light beam to scan a bar code symbol, detection means for receiving reflected light from the symbol to produce and electrical signal and signal processing means for processing the electrical signal to generate therefrom a digitized signal descriptive of the bar code symbol; and a single support member in the shape of a ring for mounting said housing on a single finger, independent of the other fingers of a user.

2. A system as defined in claim 1 further comprising:

first transmission means for transmitting said digitized signal from said first housing;

receiving means for receiving said digitized signal;

a second housing to be mounted on the user for housing said receiving means; and decoder means incorporated with said second housing for translating said digitized signal into data represented by said symbol.

3. A system according to claim 2, further comprising display means for displaying said decoded data and keying means for inputting entry data, both within said second housing.

4. A system according to claim 3, further comprising second transmission means within said second housing for transmitting decoded data and said entry data to a computer unit.

5. A system according to claim 2, further comprising support means for attaching said second housing means to a wrist of or belt worn by the user.

6. A system according to claim 1, wherein said target symbol is a bar code.

7. A system according to claim 3, wherein said keying means is a touch screen keyboard and said display means is an LED display.

8. A bar code scanning system comprising:

a. an optical reading means for oscillating a light beam to scan across a target symbol, detecting reflected light and generating an analog electrical signal representative of said target symbol;

b. first housing means for housing said optical reading means; and c. a single support member in the shape of a ring on which said first housing means is mounted, wherein said support member is adapted to be worn on a single finger, and independent of other fingers, of a user and said first housing means is positioned on said support member so that said reading means generates a light beam generally in the natural pointing direction of said finger.

9. A system according to claim 8, further comprising decoding means for converting the electrical signal into decoded data representing said target symbol.

10. A system according to claim 9 further comprising:
first transmission means for transmitting said analog electrical signal; and
receiving means remote from said first housing means and worn by the user including means for converting said analog electrical signal to a corresponding digital signal, and
second housing means for housing said receiving means.

11. A system according to claim 10, further comprising display means for displaying said decoded data and keying means for inputting entry data, both within said second housing means.

12. A system according to claim 11, further comprising second transmission means within said second housing means for transmitting said decoded data and said entry data to a computer unit.

13. A system according to claim 10, further comprising support means for attaching said second housing means to a wrist of or belt worn by the user.

14. A system according to claim 11, wherein said keying means is a touch screen keyboard and said display means is an LED display.

15. A system according to claim 8, wherein said target symbol is a bar code.

16. A system according to claim 2, wherein said first transmission means is a radio frequency transmitter.

17. A system according to claim 4, wherein said second transmission means is a radio frequency transmitter.

18. A system according to claim 12, wherein said second transmission means is a radio frequency transmitter.

19. A bar code scanning system, comprising:
a light beam scanning means for oscillating a light beam to scan across a target symbol;
housing means for housing said scanning means; and
a single support member in the shape of a ring for supporting said housing means, wherein said support member is adapted to be worn on a single finger and independent of other fingers, of a user;
wherein said scanning means includes:
a flexural member supported in a cantilever fashion,
a scanning mirror mounted on said flexural member, and
means for directing said light beam onto said scanning mirror to scan said light beam across the target symbol.

20. A system as defined in claim 19, wherein said scanning means includes a laser diode.

21. A system as defined in claim 19, wherein said scanning means includes:
a magnet mounted on said flexural member, for movement therewith and
a drive coil positioned proximate to said magnet, such that a periodically changing drive signal introduced into the coil induces a force on said magnet to cause the flexural member to oscillate, thereby scanning the light beam.

22. A system according to claim 21, wherein:
said magnet is a permanent magnet;
said periodically changing drive signal has a frequency; and
said flexural member oscillates at said frequency.

23. A system according to claim 19, wherein said housing means has a cylindrical portion.

24. A system according to claim 19, further comprising:
light detecting means, supported by said support member, for detecting reflected light and generating an electrical signal representing said target symbol; and
signal processing means supported by said first support means for converting the electrical signal into a digitized signal.

25. A system according to claim 19, further comprising:
light detecting member, supported by said support means, for detecting reflected light and generating an electrical signal representing said target symbol; and
signal processing means remote from said support member and worn by the user for converting the electrical signal into a digitized signal.

26. A system according to claim 25, wherein said signal processing means includes decoding means for converting the digitized signal into decoded data representing said target symbol.

27. A system according to claim 25, wherein said a signal processing means includes display means for displaying data and input means for receiving data.

28. A system according to claim 19, further comprising:
light detecting means for detecting reflected light and generating an electrical signal representing said target symbol;
first transmission means for transmitting a signal corresponding to said electrical signal from said housing;
signal processing means for processing said transmitted signal to produce decoded data; and
second transmission means for transmitting said decoded data to a remote computer.

29. A system according to claim 28, wherein said second transmission means is a radio frequency transmitter.

30. A system according to claim 27, wherein said input means is a touch screen keyboard and said display means is an LED display.

31. A system according to claim 19, further comprising:
light detecting means for detecting reflected light and generating an electrical signal representing said target symbol;
signal processing means for processing a signal corresponding to said electrical signal;
support means for supporting said signal processing means on a wrist of or belt worn by the user.

32. A system as defined in claim 21, wherein a resonant mechanical frequency of the flexural member with the scanning mirror and magnet mounted thereon is at or near the frequency of the periodically changing drive signal.

33. A system as defined in claim 21, wherein the magnet is encircled by the drive coil, and the magnet is mounted on said flexural member with an axis extending substantially centrally through the North and South poles of the magnet and also extending substantially perpendicular to a surface of said flexural member.

34. A system as defined in claim 19, wherein said scanning means includes a visible laser diode.

35. A system as defined in claim 19, wherein said mirror is a x scanning mirror which causes high frequency x scanning of the light beam, and said scanning means further includes:

a low frequency y flexural member supported at one end in a cantilever fashion;

a high frequency y flexural member supported in cantilever fashion on said low frequency y flexural member for movement therewith; and a y scanning mirror mounted on said high frequency y flexural member for movement therewith and for receiving said high frequency x scanning light beam and forming a multi-directional scan pattern on said target symbol.

36. A system as defined in claim 35, wherein a mass is mounted on said low frequency y flexural member for movement therewith to tune the resonant frequency thereof, and said high frequency y flexural member is supported in cantilever fashion by the mass for movement therewith.

37. A bar code scanning system, comprising:

a light beam scanning means for oscillating a light beam to scan across a target symbol;

housing means for housing said scanning means; and a single support member in the shape of a ring for supporting said housing means, wherein said support member is adapted to be worn on a single finger and independent of other fingers, of a user;

wherein said scanning means includes:

a low frequency y flexural member supported at one end in a cantilever fashion, a high frequency x flexural member supported in cantilever fashion on said low frequency y flexural member for movement therewith, a scanning mirror mounted on said high frequency x flexural member for movement therewith, and means for directing said light beam onto said scanning mirror to scan said light beam across said target symbol.

38. A system as defined in claim 37, wherein said scanning means includes a laser diode.

39. A system as defined in claim 37, wherein said scanning means includes:

a first magnet mounted on said low frequency y flexural member for movement therewith, a second magnet mounted on said high frequency x flexural member for movement therewith., a y drive coil positioned proximate to said magnet mounted on said low frequency y flexural member, wherein a low frequency periodically changing drive signal introduced into the y drive coil induces a force on said first magnet which causes the low frequency y flexural member to oscillate, thereby driving a low frequency y scanning of the light beam, and an x drive coil positioned proximate to said magnet mounted on said high frequency x flexural member, wherein a high frequency periodically changing x drive signal introduced into the x drive coil induces a force on said second magnet which causes the high frequency x flexural member to oscillate, thereby driving a high frequency x scanning of the light beam.

40. A system according to claim 39, wherein each said magnet is a permanent magnet.

41. A system according to claim 37, wherein said housing means has a cylindrical portion.

42. A system according to claim 37, further comprising:

light detecting means for detecting reflected light and generating an electrical signal representing the target symbol; and signal processing means supported by said support member for converting the electrical signal into a digitized signal.

43. A system according to claim 37, further comprising:

light detecting means for detecting reflected light and generating an electrical signal representing the target symbol; and signal processing means remote from said scanning means and attached to or worn by the user for converting the electrical signal into a digitized signal.

44. A system according to claim 43, wherein said signal processing means includes decoding means for converting the digitized signal into decoded data representing said target symbol.

45. A system according to claim 43, wherein said signal processing means includes display means for displaying data and input means for receiving data.

46. A system according to claim 37, further comprising:

light detecting means for detecting reflected light and generating an electrical signal representing said target signal;

first transmission means for transmitting a signal corresponding to said electrical signal from said housing;

signal processing means for processing said transmitted signal to produce decoded data; and second transmission means for transmitting said decoded data to a remote computer.

47. A system according to claim 46, wherein said second transmission means is a radio frequency transmitter.

48. A system according to claim 45, wherein said input means is a touch screen keyboard and said display means is an LED display.

49. A system according to claim 37, further comprising:

light detecting means for detecting reflected light and generating an electrical signal representing said target signal;

signal processing means for processing a signal corresponding to said electrical signal; and support means for attaching said signal processing means to a wrist of or belt worn by the user.

50. A system as defined in claim 37, wherein a flexural y damping member is secured to said low frequency y flexural member.

51. A bar code scanning system, comprising:

a light beam scanning means for oscillating a light beam to scan across a target symbol;

housing means for housing said scanning means; and a single support member in the shape of a ring for supporting said housing means, wherein said support member is adapted to be worn on a single finger and independent of other fingers, of a user;

wherein said scanning means includes:

a low frequency flexural member, a high frequency flexural member supported in cantilever fashion by said low frequency flexural member for movement therewith, a scanning mirror mounted on said high frequency flexural member for movement therewith, means for directing said light beam onto said scanning mirror, and magnet means mounted on said high frequency flexural member for driving an oscillation of said flexural member to scan the light beam across the target.

52. A system as defined in claim 51, wherein said scanning means includes a laser diode.

53. A system as defined in claim 51, wherein said scanning means includes:

a y drive coil positioned proximate to said magnet means, a periodically changing y drive signal introduced into the y coil to induce a force on said magnet means such that a low frequency y drive signal causes said low frequency flexural member to oscillate thereby scanning the scanning mirror at a low frequency in a y direction, and a high frequency y drive signal causes said high frequency flexural member to oscillate thereby scanning of the mirror at a high frequency in a y direction.

54. A system according to claim 53, wherein said magnet means include two permanent magnets.

55. A system according to claim 51, wherein said housing means has a cylindrical portion.

56. A system according to claim 51, further comprising:

light detecting means for detecting reflected light and generating an electrical signal representing the target symbol; and signal processing means supported by said support member for converting the electrical signal into a digitized signal.

57. A system according to claim 51, further comprising:

light detecting means for detecting reflected light and generating an electrical signal representing the target symbol; and signal processing means remote from said support member and worn by the user for converting the electrical signal into a digitized signal.

58. A system according to claim 51, further comprising:

light detecting means for detecting reflected light and generating an electrical signal representing said target symbol; and signal processing means for converting a signal corresponding to the electrical signal into decoded data representing said target symbol.

59. A system according to claim 58, wherein said signal processing means includes display means for displaying data and input means for receiving data.

60. A system according to claim 51, further comprising:

light detecting means for detecting reflected light and generating an electrical signal representing said target symbol;

first transmission means for transmitting a signal corresponding to said electrical signal from said housing;

signal processing means for processing said transmitted signal to produce decoded data; and second transmission means for transmitting said decoded data to a remote computer.

61. A system according to claim 60, wherein said second transmission means is a radio frequency transmitter.

62. A system according to claim 59, wherein said input means is a touch screen keyboard and said display means is an LED display.

63. A system according to claim 51, further comprising:

light detecting means for detecting reflected light and generating an electrical signal representing said target symbol;

signal processing means for processing a signal corresponding to the electrical signal; and support means for attaching said signal processing means to a wrist of or belt worn by the user.

64. A system as defined in claim 51, wherein said scanning means further includes:

an x drive coil positioned proximate to said magnet means, and a periodically changing x drive signal introduced into the x drive coil induces a force on said magnet means which causes the high frequency flexural member to torsionally oscillate at the frequency of the periodically changing x drive signal, thereby scanning of the light beam in an x direction.

65. A system as defined in claim 64, wherein the permanent magnet means is positioned in an air gap between the x and y drive coil, which are mounted with their central axes being substantially collinear.

66. A system as defined in claim 64, wherein the torsional resonant mechanical frequency of the high frequency flexural member with the scanning mirror and magnet means mounted thereon is at or near the frequency of the periodically changing x drive signal.

67. A system as defined in claim 53, wherein the resonant mechanical frequency of the low frequency flexural member, with the high frequency flexural member, scanning mirror and permanent magnet means mounted thereon, is at or near the frequency of the low frequency y drive signal.

68. A system as defined in claim 53, wherein the scanning means further includes:

an x drive coil mounted side by side with the y drive coil with the central drive axes thereof being parallel, the magnet is mounted proximate to the x and y drive coils, with the center of the magnet being opposed to the central drive axis of the x drive coil, which induces x scanning of the light beam, and with one end of the magnet being opposed to the central drive axis of the y drive coil, which induces y scanning of the light beam.

69. A bar code scanning system, comprising:

a light beam scanning means for oscillating a light beam to scan across a target symbol;

housing means for housing said scanning means; and a single support member in the shape of a ring for supporting said housing means, wherein said support member is adapted to be worn on a single finger and independent of other fingers, of a user;

wherein said scanning means includes:

a torsional flexural member supported at opposite ends such that the flexural member is free to torsionally flex a scanning mirror mounted on said flexural member for movement therewith, and means for directing said light beam onto said scanning mirror to scan the light beam across the target symbol.

70. A system as defined in claim 69, wherein said scanning means includes a laser diode.

71. A system as defined in claim 69, wherein said scanning means includes:

a driving coil, magnet means mounted on said torsional flexural member such that a periodically changing drive signal introduced into the driving coil.

72. A system according to claim 71, wherein said magnet means includes two permanent magnets and said torsional flexural member is supported by said driving coil.

73. A system according to claim 69, wherein said housing means has a cylindrical portion.

74. A system according to claim 69, further comprising:

light detecting means for detecting reflected light and generating an electrical signal representing the target symbol; and signal processing means supported by said support member for converting the electrical signal into a digitized signal.

75. A system according to claim 69, further comprising:

light detecting means for detecting reflected light and generating an electrical signal representing the target symbol; and signal processing means remote from said first support means and worn by the user for converting the electrical signal into a digitized signal.

76. A system according to claim 69, further comprising:

light detecting means for detecting reflected light and generating an electrical signal representing said target symbol; and signal processing means for converting a signal corresponding to the electrical signal into decoded data representing said target symbol.

77. A system according to claim 76, wherein said signal processing means includes display means for displaying data and input means for receiving data.

78. A system according to claim 69, further comprising:

light detecting means for detecting reflected light and generating an electrical signal representing said target symbol;

first transmission means for transmitting a signal corresponding to said electrical signal from said housing;

signal processing means for processing said transmitted signal to produce decoded data; and second transmission means for transmitting said decoded data to a remote computer.

79. A system according to claim 78, wherein said second transmission means is a radio frequency transmitter.

80. A system according to claim 77, wherein said input means is a touch screen keyboard and said display means is an LED display.

81. A system according to claim 69, further comprising:

light detecting means for detecting reflected light and generating an electrical signal representing said target symbol;

signal processing means for processing a signal corresponding to the electrical signal; and support means for attaching said signal processing means to a wrist of or belt worn by the user.

82. A system as claimed in claim 69, wherein said flexural member is vertically mounted on the driving coil to cause a horizontal scanning of the light beam, with the vertical mounting eliminating any drooping of the flexural member.

83. A system as claimed in claim 69, wherein said scanning means further comprises shock absorber material which mounts the flexural member on the driving coil, to absorb shocks in the event of dropping of the system.

84. A system according to claim 35, wherein said scanning means further includes:

a y magnet mounted on said high frequency y flexural member for movement therewith; and a y coil positioned proximate to said y magnet, and a periodically changing drive signal introduced into the y coil induces a force onto said y magnet such that said low frequency y flexural member oscillates said y scanning mirror to cause a low frequency y scanning light beam with said periodically changing drive signal driven at a low frequency and said high frequency y flexural member oscillates said y scanning mirror to cause a high frequency y scanning light beam with said periodically changing drive signal driven at a high frequency.

85. A system according to claim 8, wherein said optical reading means includes:

a flexural member, a optical scan element for directing said light beam mounted on said flexural member for movement therewith, and means for moving said flexural member so as to scan the light beam along a path in a field of view to impinge upon the target symbol.

86. A system according to claim 1, wherein said scanning means includes:

a flexural member, a optical scan element for directing said light beam, mounted on said flexural member for movement therewith, and means for moving said flexural member so as to scan the light beam along a path in a field of view to impinge upon the symbol to be read.

* * * * *